Feb. 28, 1967 P. F. GIOMETTI 3,306,409
CENTRIFUGALLY-CONTROLLED, HELICALLY-SPLINED
DENTIL OVERRUNNING CLUTCH
Filed April 19, 1965

WITNESS:
Esther M. Stockton

INVENTOR.
Paul F. Giometti
BY
W. S. Thompson
ATTORNEY

United States Patent Office 3,306,409
Patented Feb. 28, 1967

3,306,409
CENTRIFUGALLY-CONTROLLED, HELICALLY-SPLINED DENTIL OVERRUNNING CLUTCH
Paul F. Giometti, Warren, Mich., assignor to The Bendix Corporation, Elmira, N.Y., a corporation of Delaware
Filed Apr. 19, 1965, Ser. No. 449,207
3 Claims. (Cl. 192—104)

This invention relates to a starter clutch device and more particularly, to an automatic engaging and disengaging mechanism with an overunning clutch operated by a novel combination of centrifugal weight and a retarder spring.

It is an object of this invention to provide a simple, efficient and reliable means for automatically engaging and disengaging clutch teeth of an overrunning clutch to prevent long term clutch tooth clashing and the accompanying deleterious wear.

It is another object of this invention to provide a simple and reliable mechanism for insuring meshing of clutch teeth and thereby preventing damage to clutch teeth.

It is a further object of the present invention to provide an entirely self-contained unit which may be connected to various starting motors and engines to be started.

It is a still further object of the present invention to eliminate all connection between the started engine and the starter motor.

It is an object of the present invention to eliminate unwanted axial movement of the driving clutch member caused by vibration.

Figures 1, 2, 3, 4:
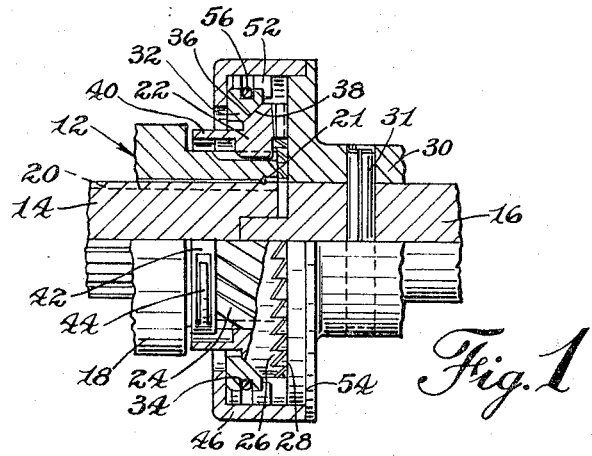
FIGURE 1 is an axial view of an embodiment of the invention, partly in section and partly broken away, showing the clutch mechanism with the clutch teeth in full engagement.
FIGURE 2 is an axial view of an embodiment of the invention, partly broken away, showing the clutch mechanism during disengagement of the clutch teeth.
FIGURE 3 is an isometric view of a centrifugal weight retainer member utilized in the preferred embodiment of the invention.
FIGURE 4 is an isometric view of the centrifugal weight members of the preferred embodiment of the invention.

Referring to the drawing, FIGURE 1 depicts a starter clutch device generally designated by numeral 12 having a driving shaft 14 in axial alignment with a driven shaft 16. A collar member 18 is connected by splines 20 to the driving shaft 14. A split ring 21 fixes the collar member 18 to the driving shaft 14. The collar member 18 has a helical spline 24 formed on the end thereof adjacent the driving clutch 22 which has complementary helical splines threaded on the collar member 18. The driving clutch 22 has clutch teeth or dentils 26 formed on one face which are adapted to engage the clutch teeth or dentils 28 of the driven clutch 30 which, in turn, is connected to shaft 16 by pin 31. Four segmental centrifugal weight members 32, shown in detail in FIGURE 4, each have a grooved outer surface 34 and an oblique face 36 on the transverse face nearest the driving clutch for complementing and abutting the oblique face 38 of the driving clutch member 22. The driving clutch member 22 has an axial projection 40 to which is secured a retarder ring 42 having radially-inwardly-depending fingers 44.

An annular centrifugal weight retainer member 46, shown in detail in FIGURE 3, having an axially-extending wall 48, a radially-extending wall 50 and radially-inwardly-formed lugs 52, is secured to the driven clutch member at 54. The lugs 52 and the weights 32 turn together about the driven shaft. The lugs 52, being so adapted to permit the weights 32 to move radially responsive to the angular velocity of the driven shaft 16. A ring-shaped spring member 56 is adapted to fit the groove 34 of the centrifugal weights 32.

If the device were at rest, as shown in FIGURE 1, its operation would be as follows. The ring-shaped spring member 56 biases the centrifugal weights inwardly, forcing oblique surfaces 36 against the oblique surface of the driving clutch member 22, forcing the driving clutch teeth or dentils 26 into engagement with the driven clutch teeth or dentils 28.

As the driving shaft 14 rotates, it carries with it the driving clutch 22 and the driving clutch collar 18, thereby rotating the driven clutch 30, the driven shaft 16 and the annular centrifugal weight retainer member 46, cranking the engine to be started (not shown). When the engine to be started attains a true start, the driven clutch 30 overspeeds and overruns the driving clutch 22. The centrifugal weights 32 move radially outwardly against the ring-shaped spring member 56 within adjacent lugs 52. The oblique faces 36 of the centrifugal weights 32 move away from the oblique face 38 of the driving clutch 22 as shown in FIGURE 2. The driven clutch teeth 28 pushing the driving clutch teeth 26 away from the driving clutch 22 towards disengagement and into the retracted position shown in FIGURE 2. The radially-inwardly-depending fingers 44 of the retarder ring 42 frictionally engage the collar member 18 to resist the rotation of the driving clutch relative to the collar member, resisting the driving clutch's axial movement on the collar member effective to hold the driving clutch 22 in the retracted position, effectively maintaining the driving clutch member's 22 disengagement from the driven clutch 30 as shown in FIGURE 2.

The mass, shape and size of the centrifugal weights 32 are so designed in conjunction with the spring constant of the ring-shaped spring member 56 that the centrifugal weights 32 disengage the oblique face 36 of the driving clutch 22 at a speed above starter motor (not shown) cranking speed but below idle speed of the engine (not shown) to be started.

When the started engine speed falls below starting speed, the ring-shaped spring member 56 presses the centrifugal weights 32 against the oblique face 38 of the driving clutch 22, moving the driving clutch teeth 26 towards engagement with the driven clutch teeth 28. The driven clutch teeth 28 will overrun the driving clutch teeth 26 for a short period of time as the driven shaft 16 comes to a halt. If, when the driven shaft 16 comes to rest, the driven clutch teeth 28 and the driven clutch should be end to end, the clutch teeth will automatically reengage upon the next start because of the shape of the clutch teeth. The device is now fully ready for the next start.

If, during the starting phase of the operation of the device, the engine to be started should momentarily overspeed the driving clutch 22, the inertia of the centrifugal weights 32 will prevent the disengagement of the driving clutch teeth 26 from the driven clutch teeth 28.

It can be seen that what is disclosed is an automatically engaging and disengaging starter clutch device which is simple, reliable and relatively inexpensive to construct and assemble. The device disclosed disengages at a predetermined speed. The device, because of the shape of the clutch teeth and the method of re-engagement of the clutch teeth, insures clutch tooth engagement upon starting, preventing clashing of clutch teeth and the ensuing clutch tooth damage. The automatic disengaging of clutch teeth prevents long-term clutch tooth clashing and the accompanying deleterious wear. Further, by moving the driving clutch out of engagement, damage to the starter motor by high speed rotation of the driving shaft is avoided. In addition, the retarder effectively prevents unwanted contact between clutch members when the engine is operating. The device is so constructed that it may be connected to a wide variety of commercial starter motors and engines to be started.

Those skilled in the art will appreciate that variations of the invention may be made without departing from the scope or spirit thereof.

I claim:
1. A clutch for drivingly connecting axially-aligned driving and driven shafts comprising:
 a collar member secured to the driving shaft, said collar member having a first helical spline formed on one end thereof;
 a driving clutch member having a second helical spline formed thereon adapted to engage said first helical spline, said driving clutch having first clutch teeth formed on one end thereof, said driving clutch member having a first oblique outer surface;
 a driven clutch mmber having second clutch teeth formed thereon adapted to engage said first clutch teeth;
 a plurality of grooved segmental centrifugal weight members having a second oblique surface in contact with said first oblique surface;
 an annular centrifugal weight retainer member having a radially-inwardly-extending projection on one end thereof and secured to said driven clutch member;
 said centrifugal weight retainer member having radially-inwardly-projecting lugs driving said centrifugal weights with said driven clutch member and permitting said centrifugal weights to move radially responsive to the angular velocity of said driven clutch member;
 a ring-shaped spring member fitted to said grooves of said centrifugal weights, biasing said weights against said driving clutch member;
 an axial projection formed on the other end of the driving clutch member;
 a retarder ring having radially-inwardly-extending depending fingers secured to said axial projection; and
 said fingers adapted for frictionally engaging said collar member to resist the rotation of said driving clutch member relative to said collar member.

2. A clutch for drivingly connecting axially-aligned driving and driven shafts comprising:
 a collar member secured to the driving shaft, said collar having helical splines formed thereon adjacent one extremity;
 a driving clutch member threaded on the helical splines, said driving clutch member including a radially-outwardly oblique cam surface;
 a driven clutch member secured to the driven shaft, said clutch members having complementary torque transmitting teeth adapted to provide a driving and an overrunning connection;
 an annular centrifugal weight retainer member having an axially-extending wall and an annular radially-extending wall, said weight retainer member extending axially toward the driven clutch member and having an edge portion of the axially-extending wall secured to the driven clutch member, said weight retainer member being adapted to spatially encompass the clutch members;
 a plurality of lug means extending radially inwardly from the weight retainer member's axially-extending wall;
 a plurality of segmental centrifugal weight members, each of said members positioned between adjacent lug means and adjacent the weight retainer's radially-inwardly-extending wall, each of said weight members having a radially-inwardly oblique cam surface adapted to complement and engage the driving clutch member's oblique cam surface, said weight members further adapted to be responsive to the centrifugal force created during driven clutch member overrun; and
 retarder means supported on the driving clutch member adapted to engage the collar member for resisting axial movement relative to the collar member.

3. A clutch for drivingly connecting axially-aligned driving and driven shafts comprising:
 a driven clutch member secured to the driven shaft;
 a collar member secured to the driving shaft, said collar member having a helical spline formed on its extremity adjacent to the driven clutch;
 a driving clutch member threaded on the helical spline, said driving clutch including a radially-outwardly-extending oblique cam surface;
 complementary torque transmitting teeth formed on both of the clutch members adapted to provide a driving and an overrunning connection;
 an annular centrifugal weight retainer member having a radially-inwardly-extending portion secured to the driven clutch member adapted to spatially encompass the clutch members;
 a plurality of lug members extending radially inwardly from said annular centrifugal weight retainer;
 a plurality of segmental centrifugal weight members, one of said weight members positioned between adjacent lug members and adjacent the radially-inwardly-extending portion of said annular weight retainer member, said centrifugal weight members having radially-inwardly oblique cam surfaces adapted for complementing and engaging the driving clutch oblique cam surface, said centrifugal weight members adapted to be responsive to the angular velocity of the said driven shaft; and
 retarder means supported on the driving clutch member adapted to engage the collar member frictionally resisting the rotation of said driving clutch relative to the collar member, operative to maintain said driving clutch member disengaged from said driven clutch.

References Cited by the Examiner
UNITED STATES PATENTS

| | | | |
|---|---|---|---|
| 3,016,122 | 1/1962 | Miller | 192—104 |
| 3,181,673 | 5/1965 | Poliseo | 192—104 |
| 3,263,509 | 8/1966 | Digby | 192—104 |

DAVID J. WILLIAMOWSKY, *Primary Examiner.*

B. W. WYCHE, *Assistant Examiner.*